United States Patent
Yang (10) Patent No.: US 7,057,437 B2
(45) Date of Patent: Jun. 6, 2006

(54) METHOD FOR REDUCING ELECTROMAGNETIC INTERFERENCE IN A CLOCK GENERATING CIRCUIT

(75) Inventor: Chih-Hsiang Yang, Tao-Yuan Hsien (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 10/904,318

(22) Filed: Nov. 3, 2004

(65) Prior Publication Data
US 2006/0066373 A1    Mar. 30, 2006

(30) Foreign Application Priority Data
Sep. 24, 2004    (TW) ............................. 93129142 A (51) Int. Cl.
*H03L 7/06* (2006.01)
(52) U.S. Cl. .................... 327/291; 327/296; 327/65
(58) Field of Classification Search ............ 327/50, 327/52, 54, 108, 291, 295–297, 65
See application file for complete search history.

(56) References Cited

U.S. PATENT DOCUMENTS 6,885,227 B1 *    4/2005    Agrawal et al. ............. 327/156
6,888,444 B1 *    5/2005    Yamauchi ............... 340/286.01

OTHER PUBLICATIONS

National Semiconductor Corp. , RSDS Interface Specification, Revision 0.95, May 2001, p. 1-8.
RSDS Flat Panel Display Design Guidelines Part 1, National Semiconductor Application Note 1234, Craig Zajac, May 2002, p. 1-8.

* cited by examiner

*Primary Examiner*—Dinh T. Le
(74) *Attorney, Agent, or Firm*—Winston Hsu (57) ABSTRACT

A method of reducing electromagnetic interference in a clock generating circuit includes providing a first clock signal pair consisting of a first positive clock and a first negative clock, the first positive clock being substantially 180 degrees out of phase with the first negative clock. The method also includes providing a second clock signal pair consisting of a second positive clock and a second negative clock, the second positive clock being substantially 180 degrees out of phase with the second negative clock. The first positive clock is 180 degrees out of phase with the second positive clock and the first negative clock is 180 degrees out of phase with the second negative clock.

7 Claims, 10 Drawing Sheets

METHOD FOR REDUCING ELECTROMAGNETIC INTERFERENCE IN A CLOCK GENERATING CIRCUIT

BACKGROUND OF INVENTION

1. Field of the Invention

The present invention relates to a clock generating circuit, and more specifically, to a method and related device for reducing electromagnetic interference associated with a clock generating circuit.

2. Description of the Prior Art

Figure 1:
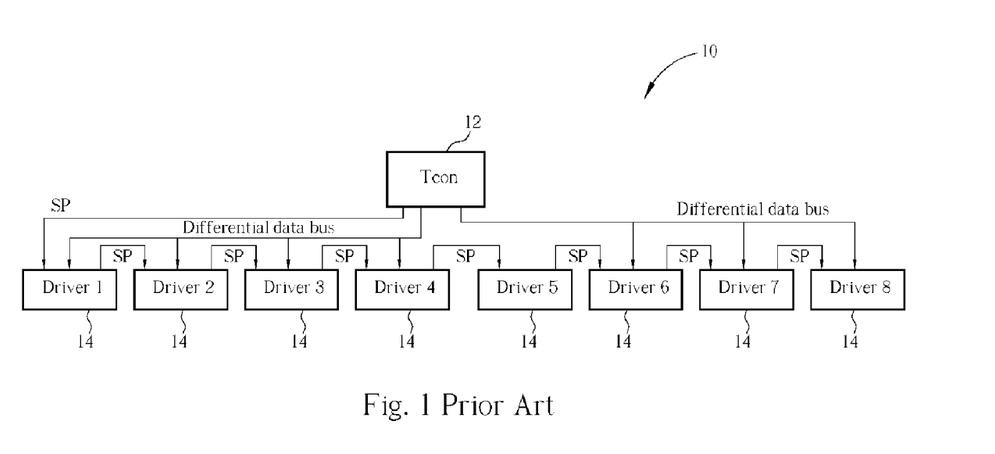
FIG. 1 is a functional block diagram of a T-Configuration of RSDS™ bus structure according to the prior art.

In many clocked circuits, a differential signal is used for generating clock signals. One application using differential signaling is shown in FIG. 1. FIG. 1 is a functional block diagram of a T-Configuration of RSDS™ bus structure 10 according to the prior art. As introduced in the RSDS™ Specification Revision 0.95, RSDS™ is a signaling standard and also a differential interface with a nominal signal swing of 200 mV. It defines the output characteristics of a transmitter and inputs of a receiver along with the protocol for a chip-to-chip interface between Flat Panel timing Controllers and Column Drivers. The RSDS™ data bus circuit 10 contains a timing controller 12 for controlling the timing of a plurality of driver circuits 14. For example, eight driver circuits 14 are shown in FIG. 1. The timing controller 12 provides the first driver circuit 14 with a start pulse SP, and each driver circuit 14 sends the start pulse SP to the succeeding driver circuit 14. When the driver circuits 14 receive the start pulse SP, the driver circuits 14 drive digital differential data bus signals in analog form.

Figure 2:
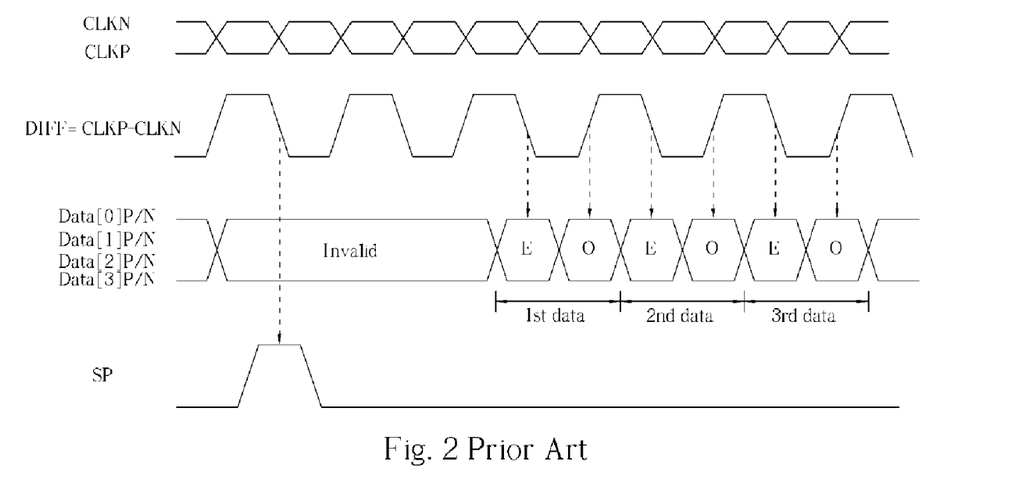
FIG. 2 is a timing diagram showing how the timing controller generates a start pulse.

Please refer to FIG. 2. FIG. 2 is a timing diagram showing how the timing controller 12 generates the start pulse SP. First of all, the timing controller 12 generates a differential pair of clock signals CLKN and CLKP. Ideally, the clock signals CLKN and CLKP should have be exactly 180 degrees out of phase with each other, have the same slew rate, and otherwise be identical to each other. A differential signal DIFF is generated from subtracting the CLKN clock signal from the CLKP clock signal. The differential signal DIFF is used for clocking data, and the start pulse SP is also generated based on the differential signal DIFF.

Figure 3:
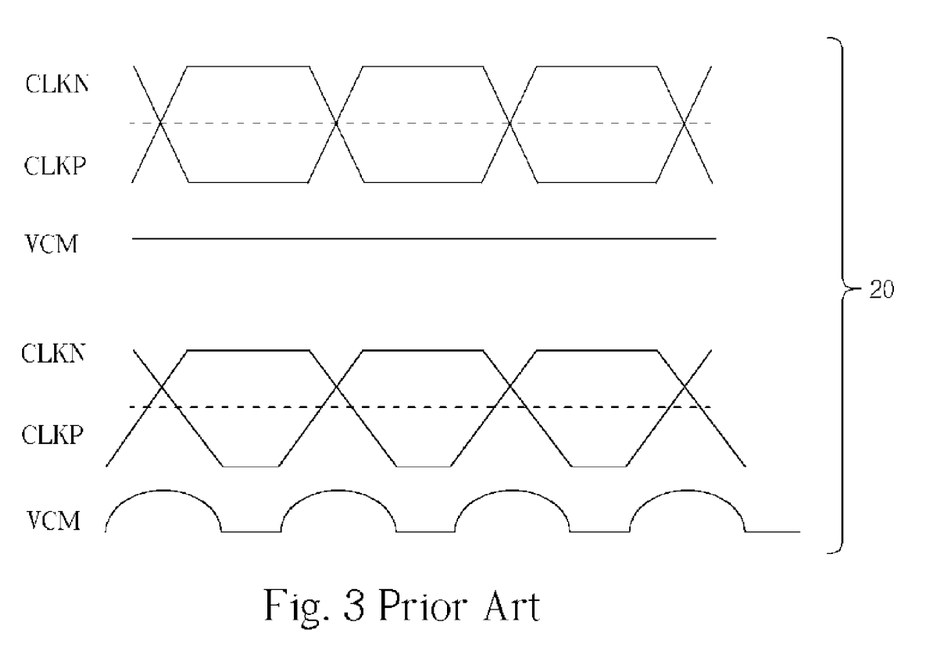
FIG. 3 is a diagram showing common mode voltages generated from balanced and unbalanced differential clock signals.

Please refer to FIG. 3. FIG. 3 is a diagram 20 showing common mode voltages generated from balanced and unbalanced differential clock signals. The differential clock pair at the top of FIG. 3 is balanced, with the clock signals CLKN and CLKP being identical with each other and exactly 180 degrees out of phase. Taking the instantaneous average of the clock signals CLKN and CLKP produces a common mode voltage VCM. When the clock signals CLKN and CLKP are balanced, the common mode voltage VCM is flat, having a value of zero.

On the other hand, the bottom of FIG. 3 shows a case where the clock signals CLKN and CLKP are unbalanced. The unbalance is usually attributed to different slew rates for the clock signals CLKN and CLKP or skews in the times when the clock signals CLKN and CLKP start rising or falling. When this unbalance occurs, the common mode voltage VCM is no longer flat and equal to zero. Unfortunately, the common mode voltage VCM is a leading source of electromagnetic interference (EMI) in the RSDS™ data bus circuit 10, which can affect the integrity of data in the RSDS™ data bus circuit 10 and other neighboring circuits.

SUMMARY OF INVENTION

It is therefore an objective of the claimed invention to provide a method for reducing EMI in a clock generating circuit in order to solve the above-mentioned problems.

According to the claimed invention, a method of reducing electromagnetic interference in a clock generating circuit includes providing a first clock signal pair consisting of a first positive clock and a first negative clock, the first positive clock being substantially 180 degrees out of phase with the first negative clock. The method also includes providing a second clock signal pair consisting of a second positive clock and a second negative clock, the second positive clock being substantially 180 degrees out of phase with the second negative clock. The first positive clock is 180 degrees out of phase with the second positive clock and the first negative clock is 180 degrees out of phase with the second negative clock.

It is an advantage of the claimed invention that the first positive clock is 180 degrees out of phase with the second positive clock and the first negative clock is 180 degrees out of phase with the second negative clock. Any EMI created in the first clock signal pair will be substantially equal in magnitude and opposite in sign of EMI created in the second clock signal pair. Therefore, by using both the first and the second clock signal pairs for producing clock signals, the net generation of EMI is drastically reduced.

These and other objectives of the claimed invention will no doubt become obvious to those of ordinary skill in the art after reading the following detailed description of the preferred embodiment, which is illustrated in the figure below.

DETAILED DESCRIPTION

Figure 4:
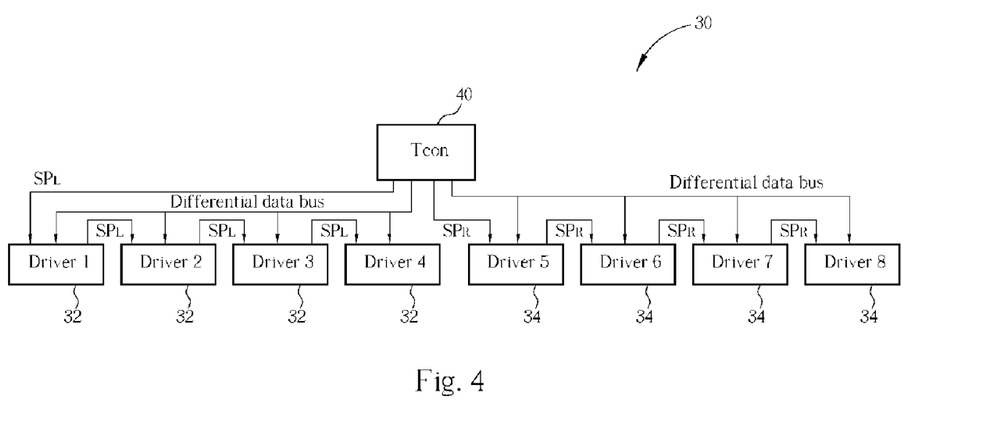
FIG. 4 is a functional block diagram of a Dual Bus Configuration (SXGA system) of an RSDS™ data bus circuit according to the present invention.

Please refer to FIG. 4. FIG. 4 is a functional block diagram of a Dual Bus Configuration (SXGA system) of an RSDS™ data bus circuit 30 according to the present invention. Like the RSDS™ data bus circuit 10 shown in FIG. 1, the RSDS™ data bus circuit 30 contains a timing controller 40 for controlling the timing of a plurality of driver circuits 32 and 34. Two groups of driver circuits 32 and 34 are used with the present invention. As an example, eight driver circuits 32 and 34 are shown in FIG. 4, with the first through fourth driver circuits 32 located on the left-hand side of FIG.

4 and the fifth through eighth driver circuits 34 located on the right-hand side of FIG. 4.

The timing controller 40 provides the first driver circuit 32 with a left start pulse $SP_L$ and provides the fifth driver circuit 34 with a right start pulse $SP_R$. Therefore, two separate start pulses are used with the RSDS™ data bus circuit 30 of the present invention as opposed to one start pulse used with the RSDS™ data bus circuit 10 of the prior art. The timing controller 40 provides the first driver circuit 32 with the left start pulse $SP_L$, and which in turn sends the left start pulse $SP_L$ to the second, third, and fourth driver circuits 32 successively. Likewise, the timing controller 40 provides the fifth driver circuit 34 with the right start pulse $SP_R$, and which in turn sends the right start pulse $SP_R$ to the sixth, seventh, and eighth driver circuits 34 successively. When the driver circuits 32 and 34 receive the left and right start pulses $SP_L$ and $SP_R$, the driver circuits 32 and 34 drive digital differential data bus signals in analog form.

Figure 5:
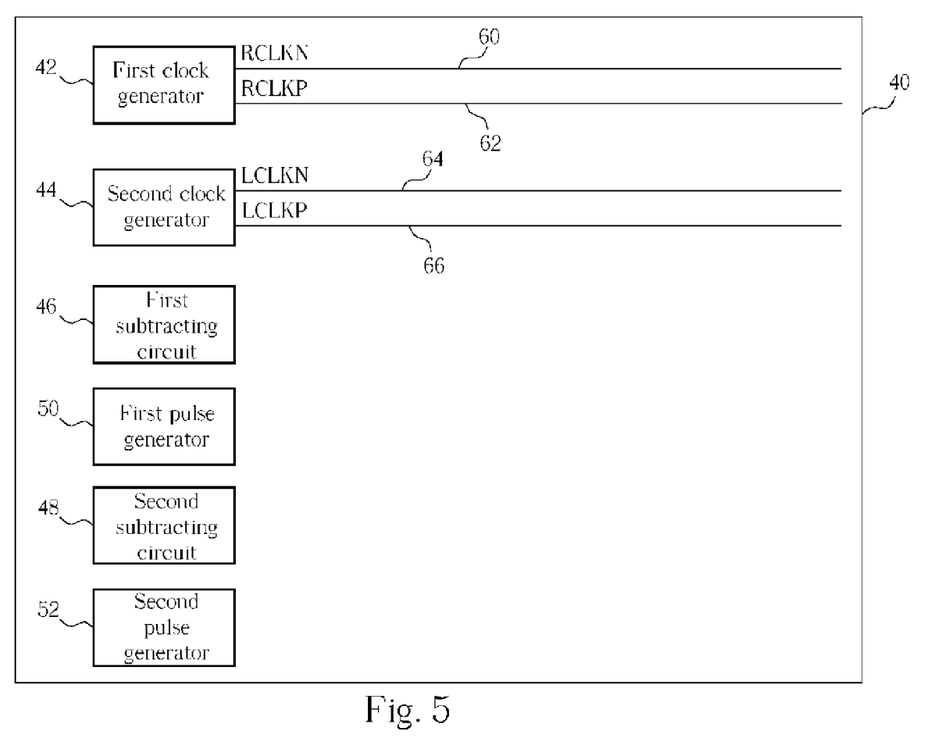
FIG. 5 is a detailed diagram of the timing controller.
Figure 6:
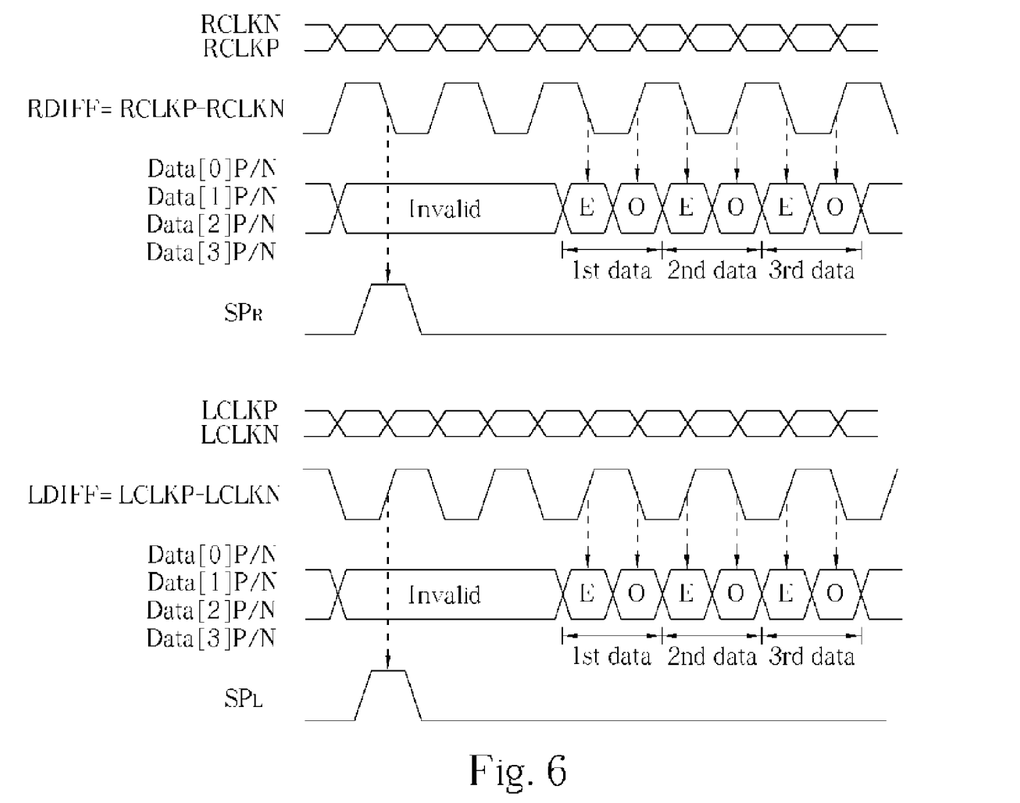
FIG. 6 is a timing diagram showing how the timing controller generates a right start pulse and a left start pulse.

Please refer to FIG. 5 and FIG. 6. FIG. 5 is a detailed diagram of the timing controller 40. FIG. 6 is a timing diagram showing how the timing controller 40 generates the right start pulse $SP_R$ and the left start pulse $SP_L$. The timing controller 40 includes a first clock generator 42 for generating a first differential pair of clock signals RCLKN and RCLKP. The first differential pair of clock signals RCLKN and RCLKP is transmitted on a first pair of signal traces 60 and 62. The timing controller 40 also contains a second clock generator 44 for generating a second differential pair of clock signals LCLKN and LCLKP. The second differential pair of clock signals LCLKN and LCLKP is transmitted on a second pair of signal traces 64 and 66.

The timing controller 40 also contains a first subtracting circuit 46 for generating a first differential clock RDIFF by subtracting the RCLKN clock signal from the RCLKP clock signal. Similarly, a second subtracting circuit 48 generates a second differential clock LDIFF by subtracting the LCLKN clock signal from the LCLKP clock signal. A first pulse generator 50 and a second pulse generator 52 generate the right start pulse $SP_R$ and the left start pulse $SP_L$ based on the first differential clock RDIFF and the second differential clock LDIFF, respectively.

The RCLKN clock signal is substantially 180 degrees out of phase with the RCLKP clock signal, as shown in FIG. 6. Likewise, the LCLKN clock signal is substantially 180 degrees out of phase with the LCLKP clock signal. Additionally, the RCLKN clock signal of the first differential pair is substantially 180 degrees out of phase with the LCLKN clock signal of the second differential pair, and the RCLKP clock signal of the first differential pair is substantially 180 degrees out of phase with the LCLKP clock signal of the second differential pair. This latest fact is relied upon for reducing the EMI in the present invention, as will be explained below.

Figure 7:
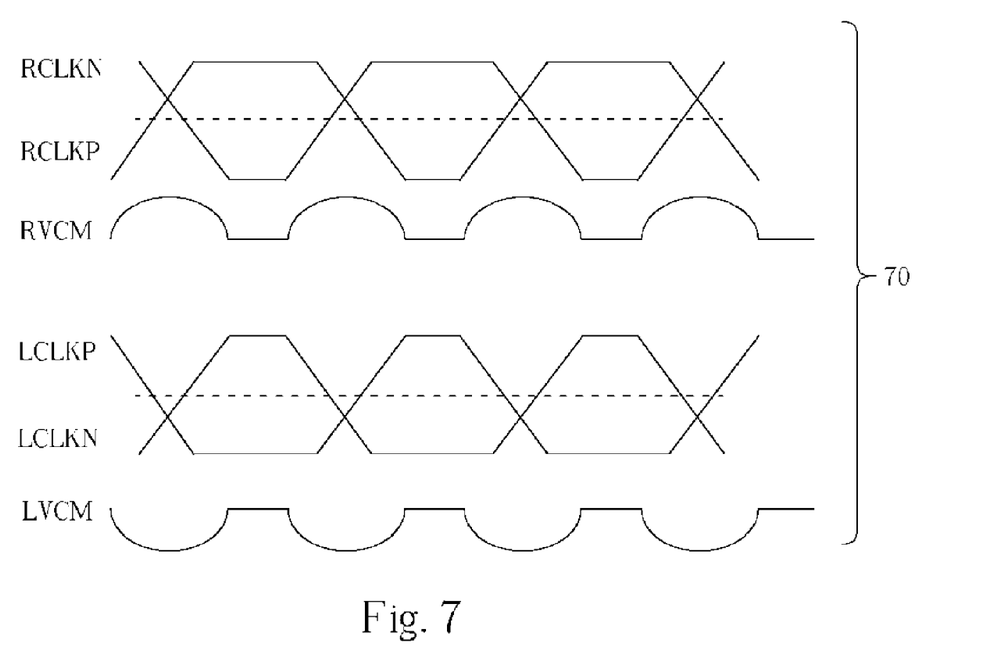
FIG. 7 is a diagram illustrating common mode voltages created by unbalanced differential clock signals.

Please refer to FIG. 7. FIG. 7 is a diagram illustrating common mode voltages created by unbalanced differential clock signals. The RCLKN clock signal does not have the same slew rate and duty cycle as the RCLKP clock signal. Therefore, a right common mode voltage RVCM, which is the instantaneous average of the clock signals RCLKN and RCLKP, does not have a constant zero value. For these same reasons, the LCLKN and LCLKP clock signals also produce a left common mode voltage LVCM. The right common mode voltage RVCM and the left common mode voltage LVCM have approximately the same magnitude and phase as each other, but have the opposite sign. For example, in FIG. 7, the right common mode voltage RVCM is shown as being non-negative, whereas the left common mode voltage LVCM is shown as being non-positive. Because these two common mode voltages RVCM and LVCM have opposite signs and approximately the same magnitude, the EMI caused by these respective common mode voltages RVCM and LVCM is mostly cancelled out.

Figure 8:
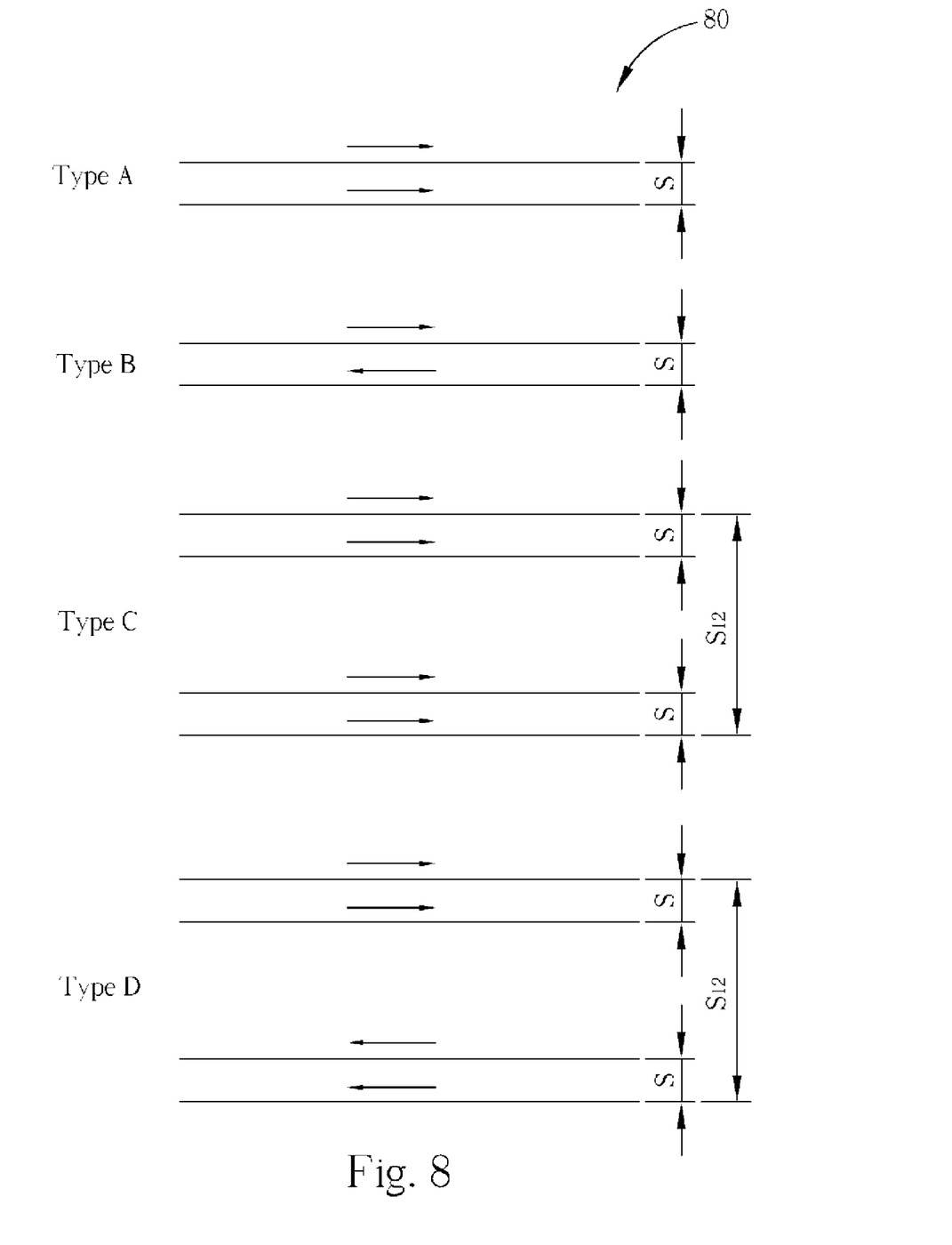
FIG. 8 is a diagram of four different types of radiation field intensities.

Please refer to FIG. 8. FIG. 8 is a diagram 80 of four different types of radiation field intensities. Four types of radiation field intensities are shown, Types A, B, C, and D, and each of these types is a source of EMI. Type A is simply called common mode radiation, and occurs with a single pair of signals traveling in the same direction. Type B is called differential mode radiation, and occurs with a single pair of signals traveling in opposite directions. For types A and B, the distance between the pair of wires on which the signals travel is a distance S. Types C and D each use two pairs of signals. Each pair of wires is still a distance S apart, but the distance between each pair is a longer distance $S_{12}$. In type C, the two pairs of signals are all traveling in the same direction. Therefore, not only is there radiation within each pair of signals, but there is also radiation between the two pairs of signals. In type D, the first pair of signals are traveling one direction while the second pair of signals are traveling the opposite direction.

Since the present invention uses two differential pairs of clock signals RCLKN, RCLKP and LCLKN, LCLKP, type C radiation could potentially be the largest source of EMI in the present invention. As is well known by those skilled in the art, the magnitude of type C radiation is usually much larger than the magnitude of type D radiation. However, since the right common mode voltage RVCM is approximately equal in magnitude and opposite in sign of the left common mode voltage LVCM, the type C radiation and the resulting EMI are substantially reduced.

Figure 9:
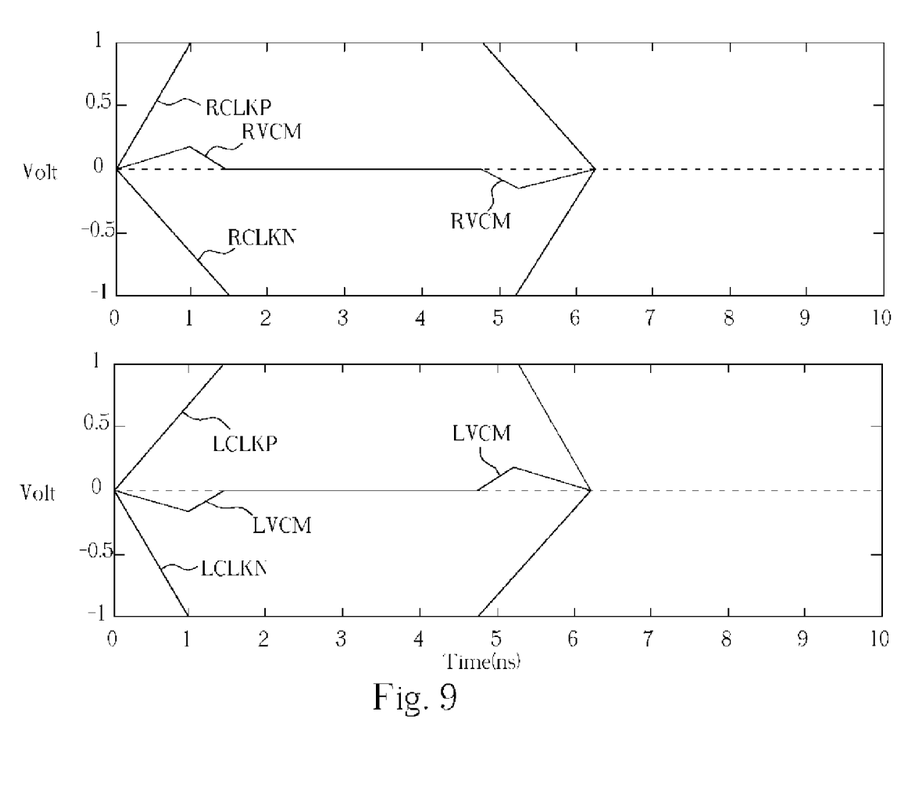
FIG. 9 is a simulation of the common mode voltages associated with the present invention.

Please refer to FIG. 9. FIG. 9 is a simulation of the common mode voltages associated with the present invention. The simulation depicts voltage values versus time. The top half of FIG. 9 shows the waveforms for the clock signals RCLKN and RCLKP and the right common mode voltage RVCM. The bottom half of FIG. 9 shows the waveforms for the clock signals LCLKN and LCLKP and the left common mode voltage LVCM. The right and left common mode voltages RVCM and LVCM either have a magnitude equal to zero, or are voltages that are opposite in sign and approximately equal in magnitude. Therefore, the right and left common mode voltages RVCM and LVCM substantially cancel each other out, which reduces the amount of EMI produced.

Figure 10:
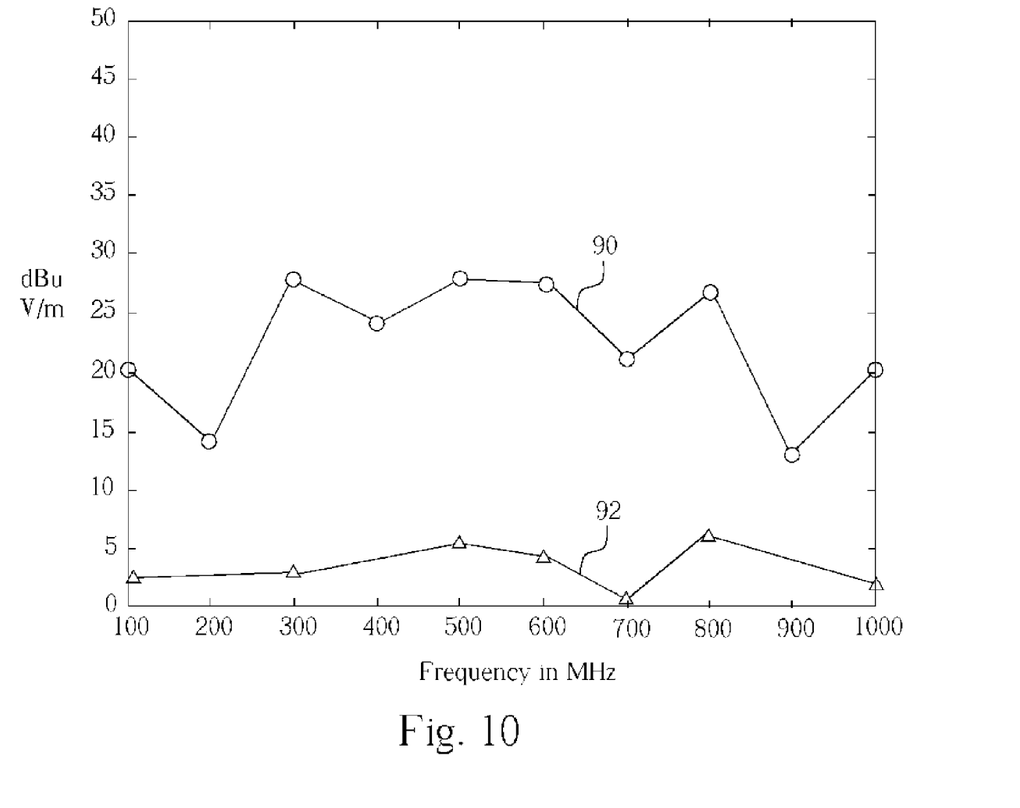
FIG. 10 is a simulation in the frequency domain comparing EMI values of the prior art and the present invention.

Please refer to FIG. 10. FIG. 10 is a simulation in the frequency domain comparing EMI values of the prior art and the present invention. A first set of data points 90 shows the EMI values that were measured in the prior art using the single differential pair of clock signals. A second set of data points 92 shows the EMI values that were measured using the two differential pairs of clock signals of the present invention. The simulation depicts the magnitude of the EMI versus frequency. As can be seen, the EMI experienced with the present invention is drastically lower than it was in the prior art since the common mode voltages cancel each other out.

In summary, the present invention uses two differential pairs of clock signals RCLKN, RCLKP and LCLKN, LCLKP. By creating a 180 degree phase difference between the RCLKN and LCLKN and between the RCLKP and LCLKP, the common mode voltages resulting from each differential pair of clock signals have approximately the same magnitude and the opposite sign. Since the common mode voltages are essentially equal and opposite, the resulting EMI is nearly eliminated.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of reducing electromagnetic interference in a clock generating circuit, the method comprising:
    providing a first clock signal pair consisting of a first positive clock and a first negative clock, the first positive clock being substantially 180 degrees out of phase with the first negative clock;
    subtracting the first negative clock from the first positive clock to create a first differential clock;
    generating a first start pulse based on the first differential clock;
    providing a second clock signal pair consisting of a second positive clock and a second negative clock, the second positive clock being substantially 180 degrees out of phase with the second negative clock;
    subtracting the second negative clock from the second positive clock to create a second differential clock; and
    generating a second start pulse based on the second differential clock;
    wherein the first positive clock is 180 degrees out of phase with the second positive clock and the first negative clock is 180 degrees out of phase with the second negative clock.

2. The method of claim 1, wherein the first positive clock and the first negative clock have different slew rates, the second positive clock and the second negative clock have different slew rates, and a first common mode voltage caused by the different slew rates of the first clock signal pair is substantially an inverse of a second common mode voltage caused by the different slew rates of the second clock signal pair, thereby reducing electromagnetic interference.

3. The method of claim 1, further comprising:
    driving a first driving circuit with the first start pulse; and
    driving a second driving circuit with the second start pulse.

4. A timing control device, comprising:
    a first clock generator for generating a first clock signal pair consisting of a first positive clock and a first negative clock, the first positive clock being substantially 180 degrees out of phase with the first negative clock;
    a first subtracting circuit for subtracting the first negative clock from the first positive clock to create a first differential clock;
    a first pulse generator for generating a first start pulse based on the first differential clock;
    a second clock generator for generating a second clock signal pair consisting of a second positive clock and a second negative clock, the second positive clock being substantially 180 degrees out of phase with the second negative clock;
    a second subtracting circuit for subtracting the second negative clock from the second positive clock to create a second differential clock;
    a second pulse generator for generating a second start pulse based on the second differential clock; and
    a plurality of signal traces for propagating the first and second clock signal pairs;
    wherein the first positive clock is 180 degrees out of phase with the second positive clock and the first negative clock is 180 degrees out of phase with the second negative clock.

5. The timing control device of claim 4, wherein the first positive clock and the first negative clock have different slew rates, the second positive clock and the second negative clock have different slew rates, and a first common mode voltage caused by the different slew rates of the first clock signal pair is substantially an inverse of a second common mode voltage caused by the different slew rates of the second clock signal pair, thereby reducing electromagnetic interference.

6. The timing control device of claim 4 further comprising:
    a first driving circuit driven by the first start pulse; and
    a second driving circuit driven by the second start pulse.

7. A flat panel display comprising a timing control device as claimed in claim 4.

* * * * *